United States Patent
Kawakami

(12) 
(10) Patent No.: US 7,305,903 B2
(45) Date of Patent: Dec. 11, 2007

(54) BICYCLE SHIFT OPERATING DEVICE

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 642 days.

(21) Appl. No.: 10/983,089

(22) Filed: Nov. 8, 2004

(65) Prior Publication Data

US 2006/0096405 A1    May 11, 2006

(51) Int. Cl.
*F16C 1/10* (2006.01)
(52) U.S. Cl. .................................. 74/502.2; 74/473.3
(58) Field of Classification Search ..............................
74/473.13–473.15, 473.3, 500.5, 501.6, 74/502.2
See application file for complete search history.

(56) References Cited

U.S. PATENT DOCUMENTS

| | | | |
|---|---|---|---|
| 823,971 A | 6/1906 | Remondy | |
| 3,886,806 A | 6/1975 | Nagano | |
| 3,924,487 A | 12/1975 | Huret et al. | |
| 3,943,794 A | 3/1976 | Shimada | |
| 4,196,643 A | 4/1980 | Nagano | |
| 4,876,913 A | 10/1989 | Romano | |
| 4,905,537 A | 3/1990 | Nagano | |
| 5,009,629 A | 4/1991 | Tagawa | |
| 5,287,766 A * | 2/1994 | Nagano | 74/502.2 |
| 5,622,083 A | 4/1997 | Kirimoto et al. | |
| 5,904,069 A | 5/1999 | Rau et al. | |
| 5,957,002 A | 9/1999 | Ueng | |
| 6,220,111 B1 | 4/2001 | Chen | |
| 6,367,347 B1 * | 4/2002 | Blaschke et al. | 74/502.2 |
| 6,729,203 B2 * | 5/2004 | Wesling et al. | 74/502.2 |

FOREIGN PATENT DOCUMENTS

| | | |
|---|---|---|
| DE | 297 17 253 U1 | 11/1997 |
| EP | 0 856 463 A2 | 8/1998 |
| EP | 1 134 158 A2 | 9/2001 |
| EP | 1 440 878 A2 | 7/2004 |
| FR | 2 574 364 | 6/1986 |
| FR | 2 589 122 | 4/1987 |

* cited by examiner

*Primary Examiner*—Chong H Kim
(74) *Attorney, Agent, or Firm*—Global IP Counselors, LLP

(57) ABSTRACT

A bicycle shift operating device comprises a bicycle mounting member, a shift operating member, a take-up member, a positioning member, a first retaining mechanism and a second retaining mechanism. The shift operating member is rotatably coupled to the mounting member to move in opposing rotational directions. The take-up member is rotatably coupled to the mounting member to selectively pull and release a shift control cable. The positioning member is rotatably coupled to the mounting member. The first retaining mechanism is arranged to retain the positioning member relative to the mounting member. The second retaining mechanism is coupled to the take-up member and the positioning member to normally apply a retaining force on the take-up member and the positioning member. The second retaining mechanism is arranged to reduce the retaining force upon moving the shift operating member.

19 Claims, 12 Drawing Sheets

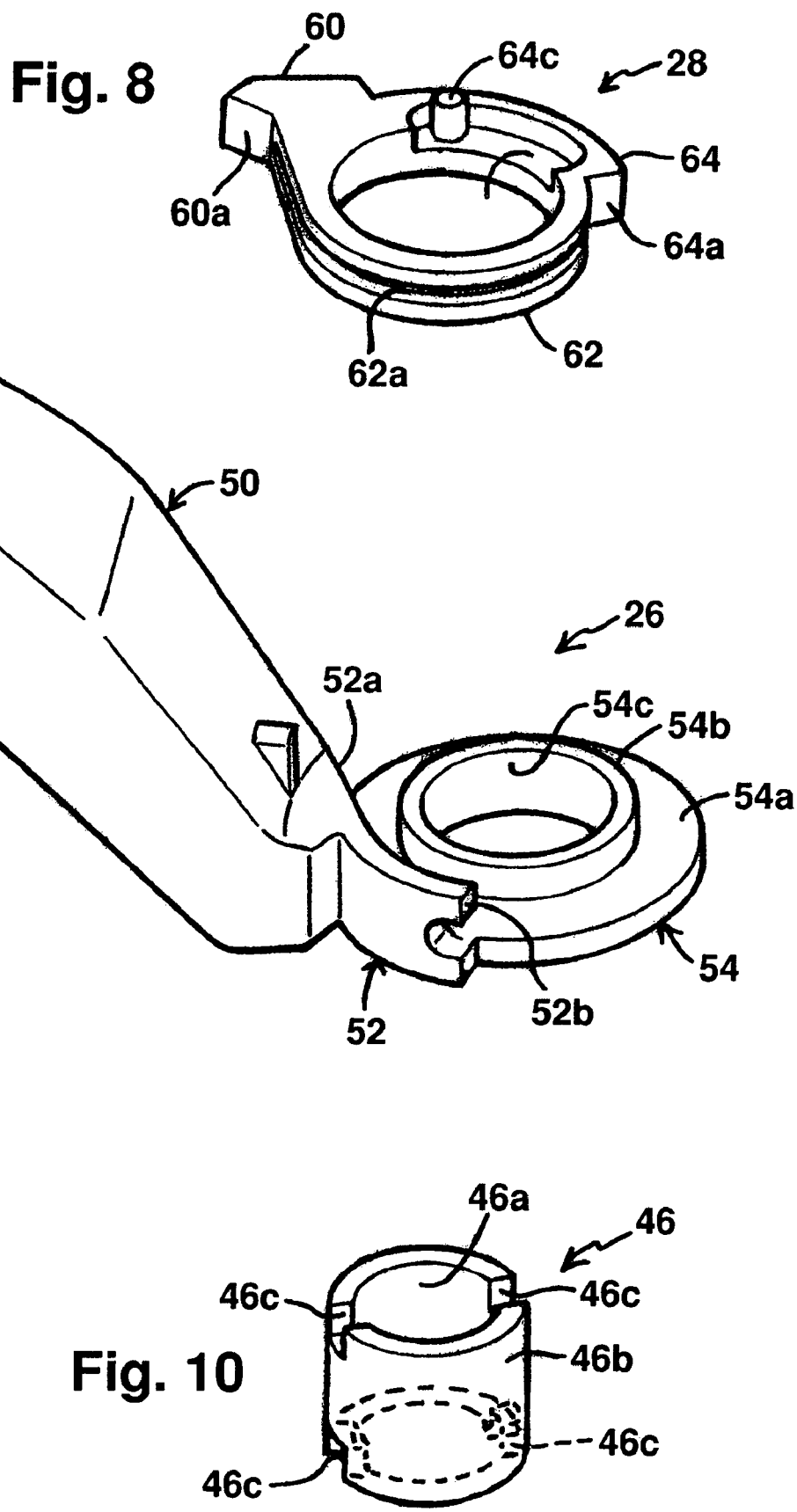

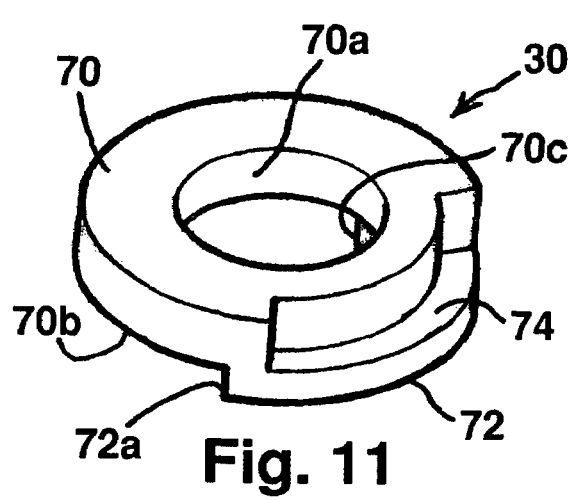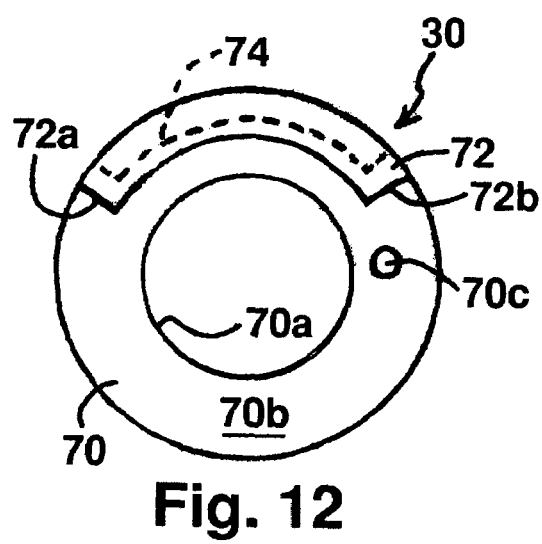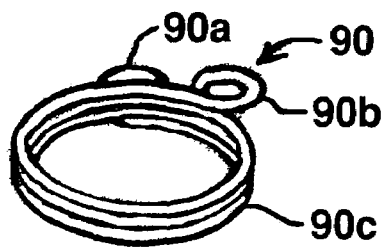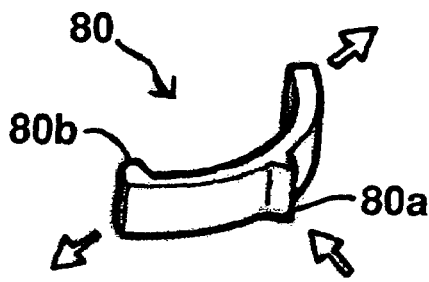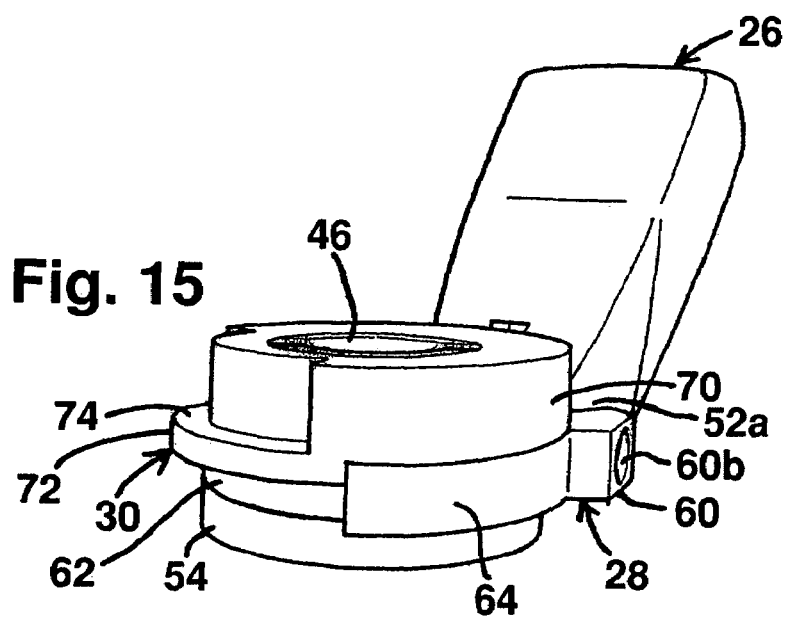

BICYCLE SHIFT OPERATING DEVICE

BACKGROUND OF THE INVENTION

1. Field of the Invention

This invention generally relates to a bicycle shift operating device. More specifically, the present invention relates to a bicycle shift operating device, which has a shift operating member that is relatively easy to move, yet is reliably retained in the desired shift position.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Specifically, the bicycle shifting mechanisms or shift operating devices have been extensively redesigned.

The bicycle shifting mechanisms are parts of the bicycle transmission. The bicycle transmission typically includes front and rear shifting mechanisms designed to operate front and rear derailleurs to move the front and rear derailleurs laterally over a plurality of front and rear sprockets, respectively. The front and rear sprockets are usually coupled to the front crank and the rear wheel, respectively, such that the pedaling force from the rider is transferred to the rear wheel via the chain. Depending on the position of the chain on the front and rear sprockets, a variety of gear ratios can be provided.

In the past, shifting mechanisms or devices have been utilized that include one or more levers that are pivoted in order to wind and unwind an inner wire of a control cable. Alternatively, rotating hand grips have also been utilized to wind and unwind the inner wire of the control cable. Two shifting mechanisms are typically provided on multi-speed bicycles. Typically, one shifting mechanism is a front shifting mechanism, while the other shifting mechanism is a rear shifting mechanism. Each shifting mechanism usually has one shift cable coupled thereto that includes an inner wire. The wires of the front and rear shifting mechanisms are coupled to the front and rear derailleurs to shift the chain over the various front and rear sprockets, respectively. While these prior shifting devices work well, the prior shift levers do not always operate as well as desired by some riders and/or these prior shifting devices can be relatively complicated and expensive to manufacture and assemble.

In view of the above, it will be apparent to those skilled in the art from this disclosure that there exists a need for an improved bicycle shift operating device. This invention addresses this need in the art as well as other needs, which will become apparent to those skilled in the art from this disclosure.

SUMMARY OF THE INVENTION

One object of the present invention is to provide a bicycle shift operating device that smoothly and reliably operates a part of a bicycle transmission such as a bicycle derailleur.

Another object of the present invention is to provide a bicycle shift operating device that has a shift operating member with a relatively "light" shifting action (i.e. that is relatively easy to move), yet is reliably retained in the desired shift position.

Yet another object of the present invention is to provide a bicycle shift operating device that is relatively simple and inexpensive to manufacture and/or assemble.

The foregoing objects can basically be attained by providing a bicycle shift operating device that comprises a mounting member, a shift operating member, a take-up member, a positioning member, a first retaining mechanism and a second retaining mechanism. The mounting member is configured to be fixedly coupled to a bicycle. The shift operating member is rotatably coupled to the mounting member to move in a first rotational direction and a second rotational direction opposite to the first rotational direction. The take-up member is rotatably coupled to the mounting member. The take-up member is arranged and configured to selectively pull and release a shift control cable. The positioning member is rotatably coupled to the mounting member. The first retaining mechanism is arranged and configured to retain the positioning member relative to the mounting member. The second retaining mechanism is coupled to the take-up member and the positioning member. The second retaining mechanism is arranged and configured to normally apply a retaining force on the take-up member and the positioning member. The second retaining mechanism is further arranged and configured to reduce the retaining force applied to the take-up member and the positioning member upon moving the shift operating member in the first rotational direction and the second rotational direction.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 8 is a further enlarged, upper perspective view of the take-up member of the left hand side shift operating device illustrated in FIG. 4;

FIG. 9 is a further enlarged, upper perspective view of the shift operating member of the left hand side shift operating device illustrated in FIG. 4;

FIG. 10 is a further enlarged, upper perspective view of the bushing of the left hand side shift operating device illustrated in FIG. 4;

FIG. 11 is a further enlarged, upper perspective view of the positioning member of the left hand side shift operating device illustrated in FIG. 4;

FIG. 12 is a bottom, plan view of the positioning member illustrated in FIG. 11;

FIG. 13 is a further enlarged, upper perspective view of the friction spring of the second retaining mechanism of the left hand side shift operating device illustrated in FIG. 4;

FIG. 14 is a further enlarged, upper perspective view of the pawl element of the first retaining mechanism of the left hand side shift operating device illustrated in FIG. 4, with arrows indicating the directions of elastic deformation;

FIG. 15 is a side perspective view of shift operating member, the take-up member and the positioning member of the left hand side shift operating device illustrated in FIG. 4, after assembly of these parts;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
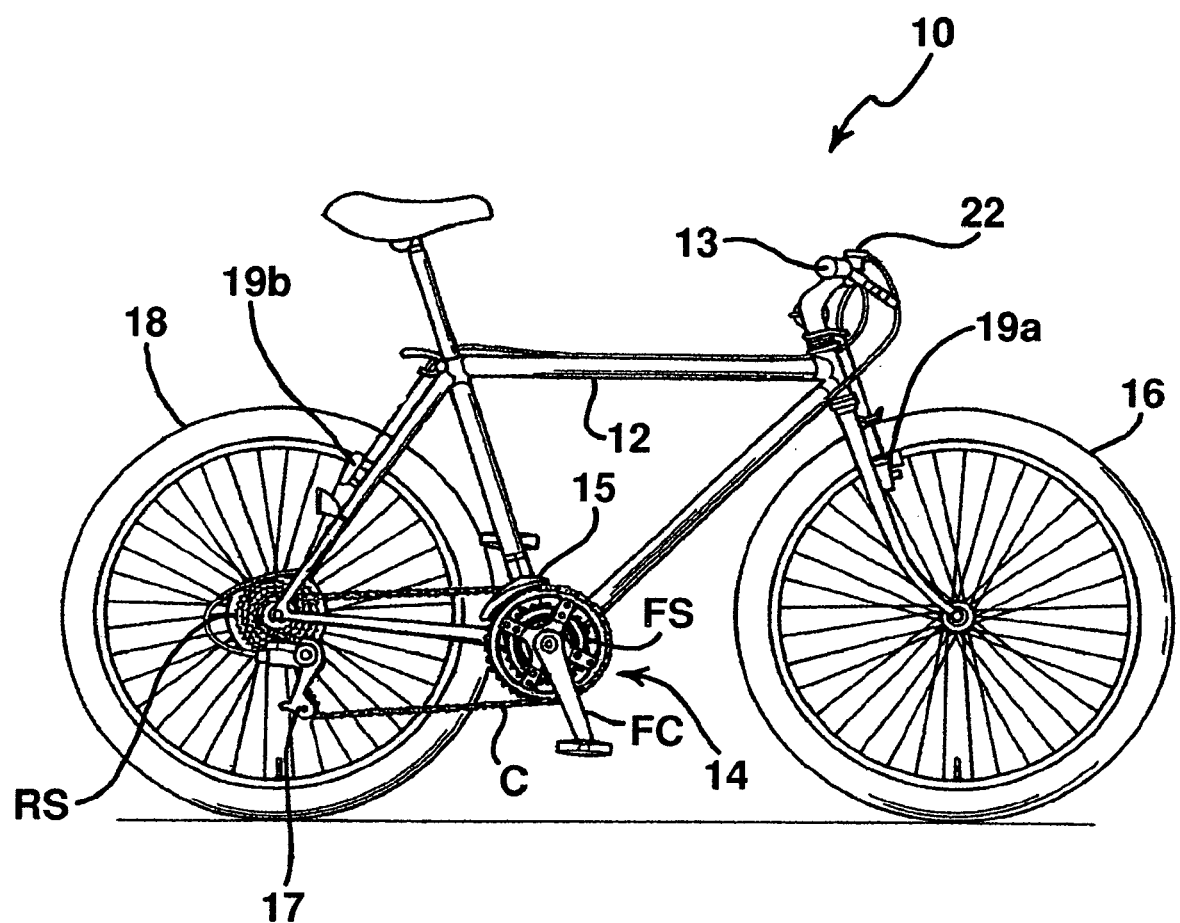
FIG. 1 is a side elevational view of a bicycle equipped with left and right hand side shift operating devices in accordance with a first preferred embodiment of the present invention.
Figure 2:
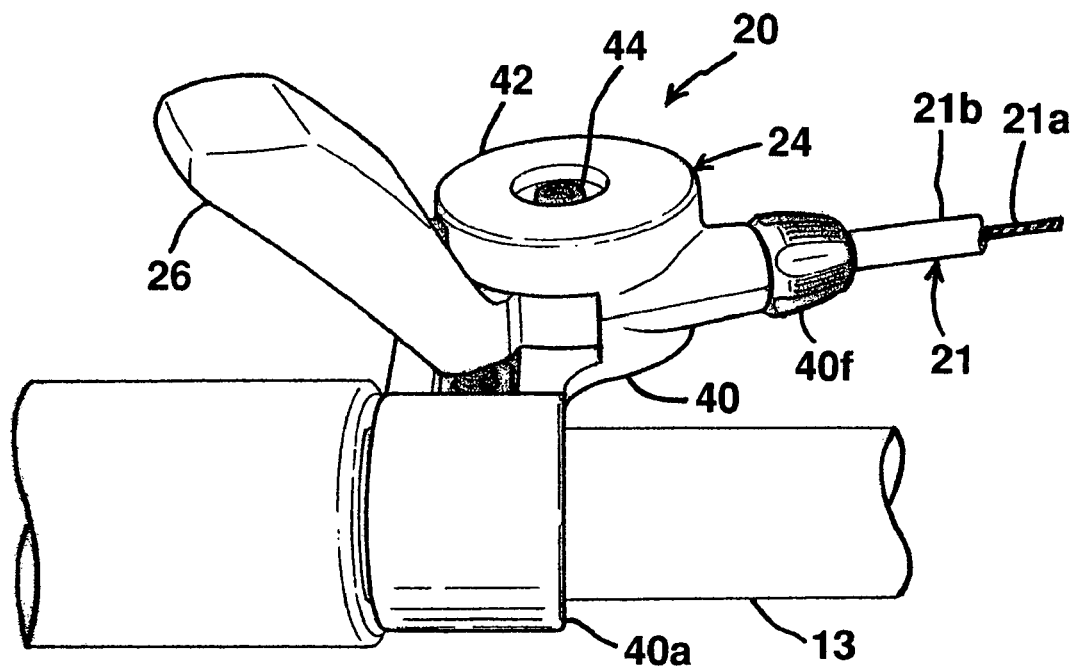
FIG. 2 is an enlarged perspective view of the left hand side shift operating device of the bicycle illustrated in FIG. 1.
Figure 3:
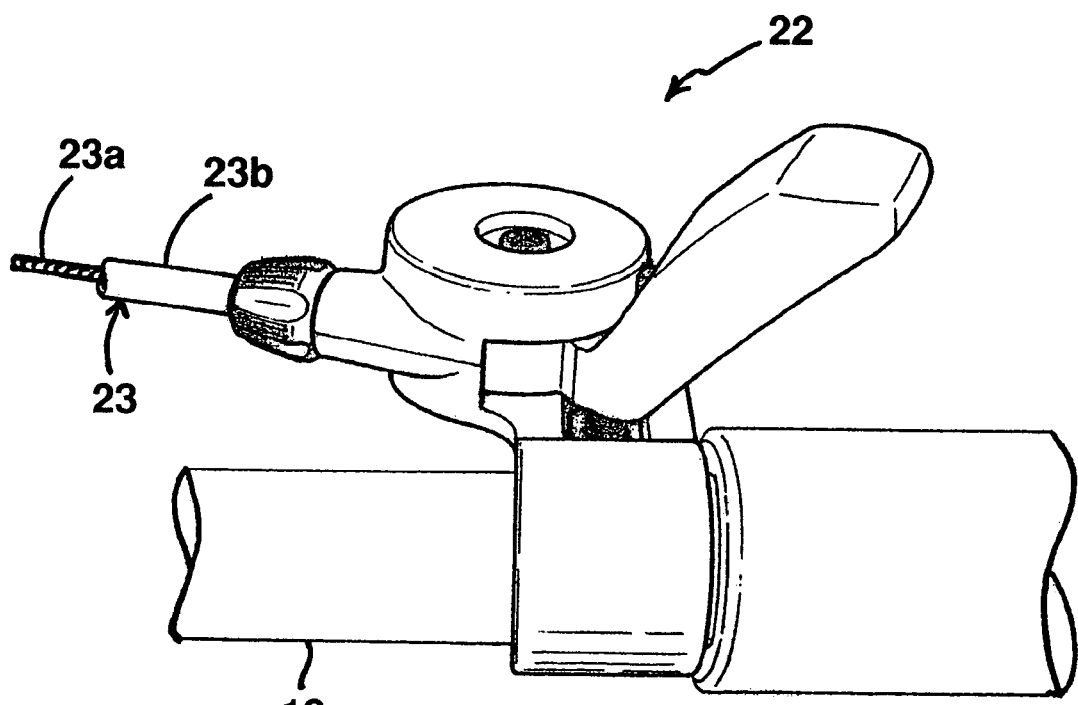
FIG. 3 is an enlarged perspective view of the right hand side shift operating device of the bicycle illustrated in FIG. 1.

Referring initially to FIGS. 1-3, a bicycle 10 is illustrated with a front (first) shift operating device 20 and a rear (second) shift operating device 22 is illustrated in accordance with a preferred embodiment of the present invention. Specifically, each of the front (first) and rear (second) shift operating devices 20 and 22 has a structure that is retained in a plurality of rotational shift positions, yet configured to reduce the internal retaining force during movement, as explained below in more detail. The bicycle 10 basically includes a frame 12, a drive train or transmission 14, a front wheel 16 and a rear wheel 18. The frame 12 includes a handlebar 13 that is fixedly coupled to the front fork of the frame 12 to steer the bicycle 10 via the front wheel 16.

The drive train or transmission 14 includes a front derailleur 15, a rear derailleur 17, a chain C, a plurality of rear sprockets RS coupled to the rear wheel 18 and a front crank FC with a plurality of front sprockets FS coupled thereto. The front and rear derailleurs 15 and 17 are coupled to the frame 12 to move/shift the chain C laterally between the various sprockets FS and RS in a conventional manner. The rear sprockets RS are coupled to the rear wheel 18 via a free wheel to selectively rotate the rear wheel 18 via the chain C in order to propel the bicycle 10 in a conventional manner.

The front shift operating device 20 is operatively coupled to the front derailleur 15 via a front (first) Bowden control cable 21 in order to shift the front derailleur 15 laterally over the front sprockets FS in a relatively conventional manner. Similarly, the rear shift operating device 22 is operatively coupled to the rear derailleur 17 via a rear (second) Bowden control cable 23 to shift the rear derailleur 17 laterally over the rear sprockets RS in a relatively conventional manner. The front and rear control cables 21 and 23 are identical except for their lengths, and are basically conventional. Thus, the control cable 21 includes an inner wire 21a slidably received within an outer casing 21b while the control cable 23 includes an inner wire 23a slidably received within an outer casing 23b.

A front brake 19a is coupled to the front fork of the bicycle frame 12, while a rear brake 19b is coupled to the rear triangle of the bicycle frame 12. The front and rear brakes 19a and 19b selectively apply a friction force to the front and rear rims of the front and rear wheels 16 and 18 to selectively stop the rotation of the front and rear wheels 16 and 18, respectively in a conventional manner. In the illustrated embodiment, each of the front and rear shift operating devices 20 and 22 is separate from the respective brake operating devices (only one shown in FIG. 1). However, it will be apparent to those skilled in the art from this disclosure that the shift operating devices 20 and 22 could be designed to have integrated brake operating devices.

The various parts of the bicycle 10 are conventional, except for the front and rear shift operating devices 20 and 22, as discussed below. Thus, the remaining parts of the bicycle 10 will not be discussed or illustrated in detail herein, except as needed to make and use the present invention. Accordingly, it will be apparent to those skilled in the art from this disclosure that various modifications can be made to the various components or parts of the bicycle 10 without departing from the scope of the present invention.

Moreover, the rear (right) shift operating device 22 is identical to the front (left) shift operating device 20, except that the rear shift operating device 22 is a mirror image of the front shift operating device 20. Accordingly, the rear shift operating device 22 will not be explained and/or illustrated in detail herein. Rather, it will be apparent to those skilled in the art from this disclosure that the descriptions, illustrations and principles of the front shift operating device 20 constructed in accordance with the present invention are also applied to the rear shift operating device 22.

Figure 4:
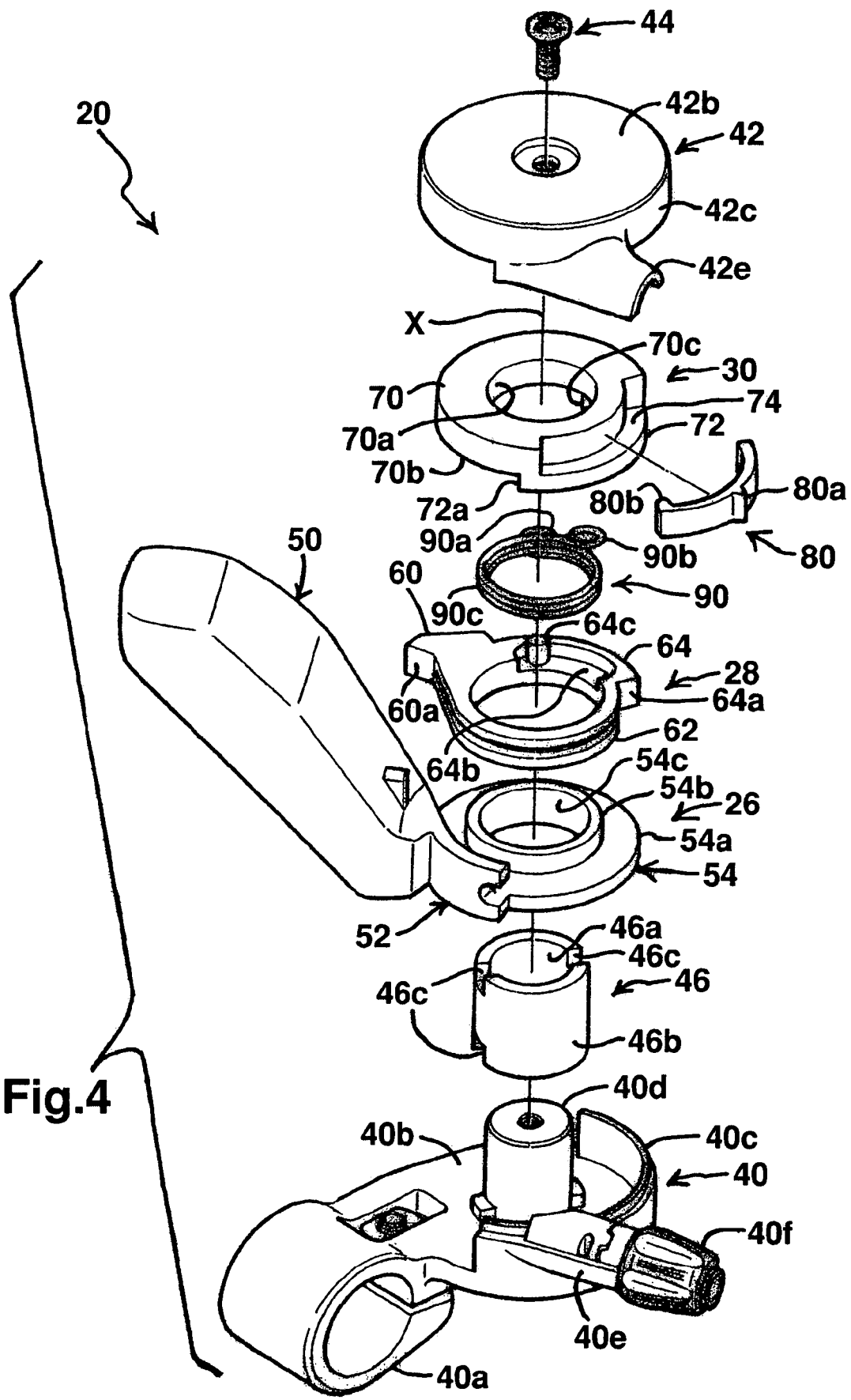
FIG. 4 is an exploded, upper perspective view of the left hand side shift operating device illustrated in FIG. 2.
Figure 5:
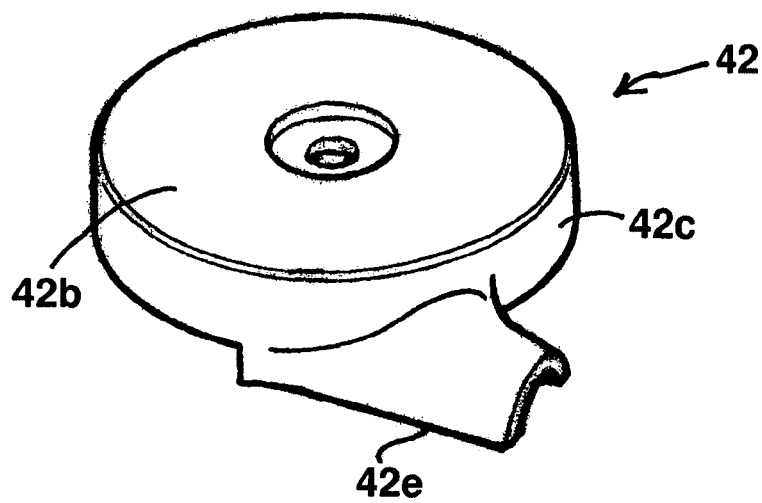
FIG. 5 is a further enlarged, upper perspective view of the cover portion of the left hand side shift operating device illustrated in FIG. 4.
Figure 6:
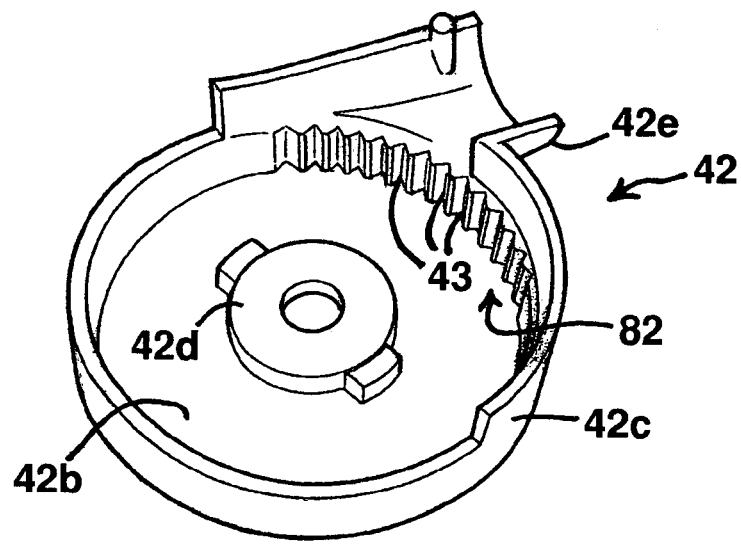
FIG. 6 is a reversed, lower perspective view of the cover portion illustrated in FIG. 5.

Referring mainly to FIGS. 2 and 4, the front shift operating device 20 basically includes a mounting assembly or mounting member 24, a shift operating member 26, a take-up member 28, a positioning member 30, a first retaining mechanism 32 and a second retaining mechanism 34. The mounting member 24 is configured to be fixedly coupled to a tubular portion of the bicycle 10 such as the handlebar 13. The shift operating member 26, the take-up member 28 and the positioning member 30 are rotatably coupled to the mounting member 24. The first retaining mechanism 32 is arranged and configured to overrideably retain the positioning member 30 relative to the mounting member 24. The second retaining mechanism 34 is arranged and configured to normally apply a retaining force on the take-up member 28 and the positioning member 30.

More specifically, the shift operating member 26 is arranged to move about a rotation axis X in a first rotational direction $R_1$ and a second rotational direction $R_2$ opposite to the first rotational direction $R_1$ to selectively rotate the take-up member 28 in the first and second rotational directions $R_1$ and $R_2$ to selectively pull and release the shift control cable 21. The positioning member 30 is operatively coupled between the shift operating member 26 and the take-up member 28. The first shift operating member 26 directly contacts the take-up member 28 to rotate the take-up member 28 in the first rotational direction $R_1$ when the shift operating member 26 is rotated in the first rotational direction $R_1$. On the other hand, the shift operating member 26 directly contacts the positioning member 30 when rotated in the second rotational direction $R_2$ to rotate the positioning member 30 in the second rotational direction $R_2$, and the positioning member 30 directly contacts the take-up member 28 to rotate the take-up member 28 in the second rotational direction $R_2$ when the positioning member 30 is rotated in the second rotational direction $R_2$.

The first retaining mechanism 32 is preferably coupled between the mounting member 24 and the positioning member 30 such that unintentional rotational movement of the positioning member 30 is selectively prevented. The second retaining mechanism 34 is operatively coupled between the take-up member 28 and the positioning member 30 such that the second retaining mechanism 34 selectively grips a portion of the mounting member 24 with a predetermined retaining force to prevent unintentional rotation of the take-up member 28. The second retaining mechanism 34 is arranged and configured to reduce the retaining force applied to the mounting member 24 and the take-up member 28 to allow rotational movement of the take-up member 28 and the positioning member 30 upon the rider moving the shift operating member 26 in the first rotational direction $R_1$ and the second rotational direction $R_2$. The operation of the front shift operating device 20 will be explained in more detail below.

Figure 7:
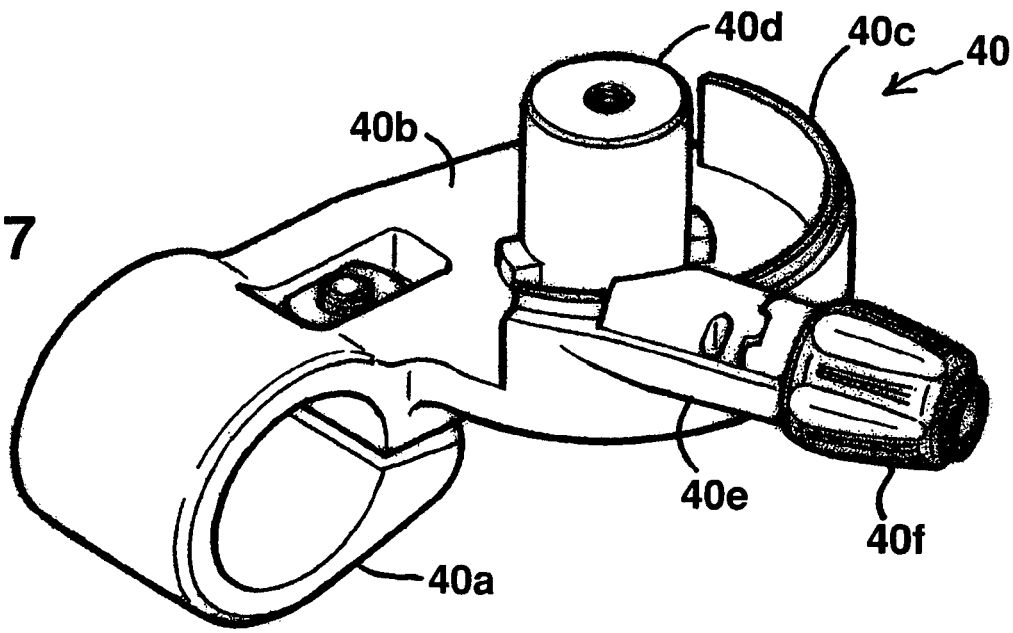
FIG. 7 is a further enlarged, upper perspective view of the main mounting portion of the left hand side shift operating device illustrated in FIG. 4.
Figure 16:
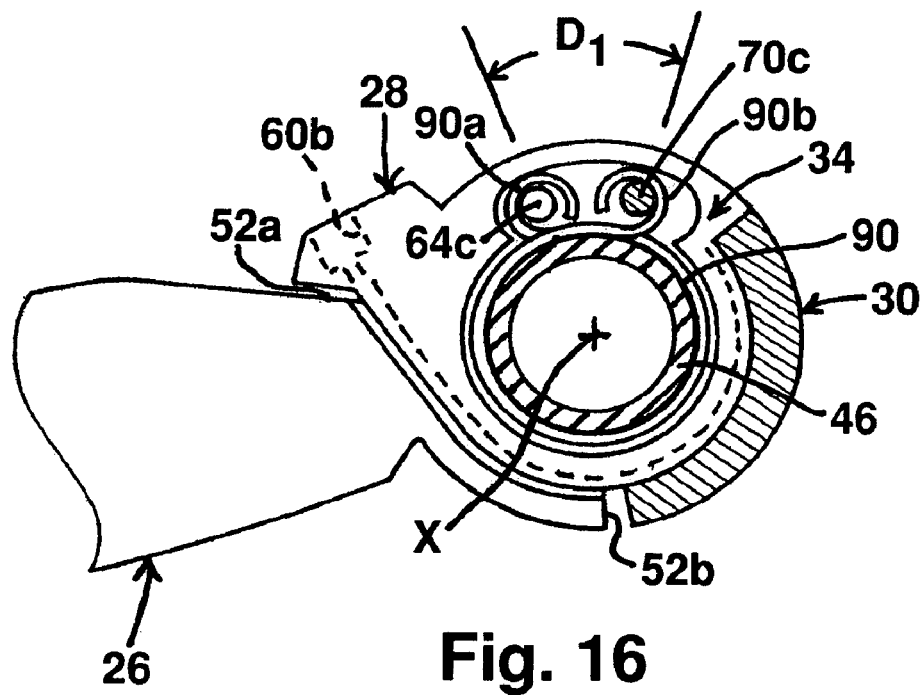
FIG. 16 is a partial top plan view of the shift operating device illustrated in FIGS. 2, 4 and 15, after assembly but prior to coupling the shift control cable thereto, and with portions broken away for the purpose of illustration.

As best seen in FIGS. 2, 4 and 7, the mounting member 24 basically includes a main mounting portion 40 and a cover portion 42 non-movably fixedly coupled to the main mounting portion 40 via a fastener 44 and a bushing 46. Specifically, the bushing 46 non-rotatably engages both the main mounting portion 40 and the cover portion 42 to form a non-movable mounting projection of the mounting member 24, while the fastener 44 holds the cover portion 42 and the main mounting portion 40 together with the bushing 46 arranged therebetween. Preferably, the fastener 44 is a screw or threaded fastener. The take-up member 28, the positioning member 30 and the shift operating member 26 are rotatably mounted around the bushing 46 (i.e. about the common pivot axis X) between the main mounting portion 40 and the cover portion 42.

The main mounting portion 40 basically includes a tubular clamping section 40a, a support element 40b, a support wall 40c, a support projection 40d and a cable support section 40e with a cable barrel adjuster 40f movably coupled therein. Preferably, the tubular clamping section 40a, the support plate 40b, the support wall 40c, the support projection 40d and the cable support section 40e are integrally formed together as a one-piece, unitary member from a lightweight rigid material such a metallic material or dense plastic material.

The tubular clamping section 40a is clamped onto the handlebar 13 with a nut and bolt (not shown in detail) in a conventional manner. The support element 40b is preferably a plate shaped element that extends away from the tubular clamping section 40a. The support wall 40c and the support projection 40d extend perpendicularly from the support element 40b. The support projection 40d preferably has a cylindrical shape with a pair of protrusions arranged to engage one end of the bushing 46 to prevent rotation of the bushing 46 relative to the support element 40b and the support projection 40d. The external size of support projection 40d is substantially the same as the internal size of the bushing 46 such that the bushing 46 is supported laterally by the support projection 40d. The cable support structure 40e has the barrel adjuster 40f coupled thereto in a conventional manner. The barrel adjuster 40f is conventional and well known in the bicycle art.

Referring to FIGS. 2, 4, 5, 6 and 25-27, the cover portion 42 is a cup-shaped element that basically includes a main cover section 42b, a side wall 42c, a projecting section 42d and a cable cover section 42e extending tangentially from the main cover section 42a. Preferably, the main cover section 42a, the side wall 42c, the projecting section 42d and a cable cover section 42e are integrally formed together as a one-piece, unitary member from a lightweight rigid material such a metallic material or dense plastic material. The main cover section 42b overlies the support element 40b of the main mounting portion 40, while the cable cover section 42e overlies the cable support section 40e with a cable barrel adjuster 40f such that the cable adjuster 40e extends outwardly to be adjustable (rotated) by hand.

The annular side wall 42c has cutout area that forms an opening of the mounting member 24 together with the main mounting portion 40 to receive the shift operating member 26 therethrough. A remaining portion of the side wall 42c rests on a ledge of the support wall 40c of the main mounting portion 40. The projecting section 42d has a size and shape identical to the support projection 40d, except the projecting section 42d is shorter in the axial direction than the support projection 40d (i.e. as measured along the rotation axis X). Like the support projection 40d, the projecting section 42d includes a pair of protrusions arranged to engage one end of the bushing 46 to prevent rotation of the bushing 46 relative to the cover portion 42. The support projection 40d preferably contacts the projecting section 42d with the bushing 46 being located on the support projection 40d and the projecting section 42d to form a non-movable mounting portion of the mounting member 24 when the cover portion 42 is fixedly attached to the main mounting portion 40.

The side wall 42c basically has a circular shape with an arc-shaped section having a plurality of notches or indentations 43 formed therein, which form part of the first retaining mechanism 32, as explained below in more detail. The fastener 44 extends through a central hole formed in the main cover section 42b and the projecting section 42d, and is coupled within a central threaded bore of the support projection 40d.

The bushing 46 is preferably a tubular element with a circular shape as viewed along the rotation axis X. The bushing 46 basically includes an inner tubular surface 46a, an outer tubular surface 46b and a pair of notches 46c formed at each end that configured to engage the protrusions of the support projection 40d and projecting section 42d. The inner surface 46a is supported on the support projection 40d and the projecting section 42d. The shift operating member 26, the take-up member 28 and the position member 30 are rotatably supported on the outer surface 46b of the bushing 46, as explained in more detail below.

Referring now to FIGS. 2, 4, 9 and 15-24, the shift operating member 26 basically includes a rider operating portion or lever 50, an actuating portion 52 and a mounting portion 54. Preferably, the rider operating portion 50, the actuating portion 52 and the mounting portion 54 are integrally formed together as a one-piece, unitary member from a lightweight rigid material such a metallic material or dense plastic material. However, it will be apparent to those skilled in the art from this disclosure that the shift operating member 26 could be constructed of several parts as needed and/or desired. For example, the shift operating member 26 could be constructed primarily of a metallic material with a plastic material overlying portions of the metal material to form the rider operating portion. In any case, the rider operating portion 50, the actuating portion 52 and the mounting portion 54 are preferably non-movably fixedly coupled together. The actuating portion 52 is located at an outer periphery of the annular mounting portion 54, while the rider operating portion 50 extends outwardly from the actuating portion 52.

The mounting portion 54 basically has an upside-down T-shape as viewed in side elevation. Specifically, the mounting portion 54 basically includes an annular plate section 54a with a tubular flange 54b extending perpendicularly thereto to form a tubular interior surface 54c and an exterior mounting area located radially outwardly of the tubular flange 54b. The tubular interior surface 54c is rotatably supported on the outer surface 46b of the bushing 46. The take-up member 28 is rotatably mounted in the mounting area radially outwardly of the tubular flange 54b on the annular plate section 54a. The tubular flange 54b preferably has an axial length shorter (e.g. about one half) than the axial length of the take-up member 28 to accommodate part of the second retaining mechanism 34, as explained below in more detail.

The actuating portion 52 basically includes a first abutment surface 52a, a second abutment surface 52b. The first abutment surface 52a faces substantially in the first rotational direction $R_1$, while the second abutment surface 52b faces substantially in the second rotational direction $R_2$. When the shift operating member 26 is rotated in the first rotational direction $R_1$, the first abutment surface 52a contacts the take-up member 28 to rotate the take-up member 28. When the shift operating member 26 is rotated in the second rotational direction $R_2$, the second abutment surface 52b contacts the positioning member 30 to rotate the position member 30 in the second rotational direction $R_2$. When the positioning member 30 is rotated in the second rotational direction $R_2$, the positioning member 30 contacts the take-up member 28 to rotate the take-up member 28 in the second rotational direction $R_2$.

Referring to FIGS. 2, 4, 8 and 15-24, the take-up member 28 is an annular member that basically includes a cable attachment portion 60 and a cable winding portion 62 with an attachment portion 64 configured to have part of the second retaining mechanism 34 attached thereto. Preferably, the cable attachment portion 60 and the cable winding portion 62 are integrally formed together as a one-piece, unitary member from a lightweight rigid material such a metallic material or dense plastic material. The cable attachment portion 60 has the end of the inner wire 21a of the control cable 21 coupled thereto in a conventional manner.

The cable attachment portion 60 extends outwardly from the cable winding portion 62 to form a third abutment surface 60a that selectively contacts the shift operating member 26. Specifically, when the shift operating member 26 is rotated in the first rotational direction $R_1$, the first abutment surface 52a of the shift operating member 26 contacts the third abutment surface 60a of the take-up member 28 to rotate the take-up member 28. The cable attachment portion 60 includes a stepped bore 60b configured to receive the inner wire 21a therein and to retain an enlarged end (not shown in detail) of the inner wire 21a.

The attachment portion 64 extends circumferentially about the cable winding portion 62 and slightly radially outwardly. The attachment portion 64 is configured and arranged to have part of the second retaining mechanism 34 coupled thereto. Specifically, the attachment portion 64 includes a fourth abutment surface 64a and a recess 64b with a first retaining pin (element) 64c arranged therein. The first retaining pin 64c has part of the second retaining mechanism 34 attached thereto, as explained below. The fourth abutment surface 64a is contacted by the positioning member 30 when the positioning member 30 is rotated in the second rotational direction $R_2$ by the shift operating member 26. The cable winding portion 62 has an internal tubular surface rotatably supported about the tubular flange 54b on the annular plate section of the shift operating member 26. The cable winding portion 62 further includes an outer groove 62a with the inner wire 21a of the control cable 21 at least partially received therein in a conventional manner.

Referring to FIGS. 2, 4, 11, 12 and 15-24, the positioning member 30 is an annular member that basically includes an annular support portion 70 and an abutment portion 72 with a recess 74 formed therein. Preferably, the support portion 70 and the abutment portion 72 are integrally formed together as a one-piece, unitary member from a lightweight rigid material such a metallic material or dense plastic material. The support portion 70 rests on the upper surface of the take-up member 28 and is rotatably supported on the outer surface 46b of the bushing 46. The abutment portion 72 is circumferentially arranged between the second abutment surface 52b of the shift operating member 26 and the fourth abutment surface 64a of the take-up member 28.

Specifically, the annular support portion 70 includes a tubular inner support surface 70a, an annular lower surface 70b and a second retaining pin (element) 70c extending downwardly from the annular lower surface 70b. The support surface 70a is rotatably supported on the bushing 46. The annular lower surface 70b is supported on the upper surface of the take-up member 28. The second retaining pin 70c has part of the second retaining mechanism 34 attached thereto, as explained below.

The abutment portion 72 of the positioning member 30 extends in a circumferential direction about the positioning member 30, and extends downwardly from the annular support portion 70. Preferably, the abutment portion 72 has an axial length smaller than half of the axially length of the take-up member 28 so as not to interfere with the inner wire 21a. The abutment portion 72 includes a fifth abutment surface 72a arranged to be contacted by the second abutment surface 52b when the shift operating member 26 is rotated in the second rotational direction $R_2$, and a sixth abutment surface 72b designed to selectively contact the fourth abutment surface 64a of the take-up member 28. The sixth abutment surface 72b contacts the fourth abutment surface 64a when the positioning member 30 is rotated in the second rotational direction $R_2$ by the shift operating member 26 and when the take-up member 28 is rotated in the first rotational direction $R_1$ by the shift operating member 26. Due to this arrangement, the first and second retaining pins 64c and 70c move circumferentially closer together when the shift operating member 26 is rotated in either of the first and second rotational directions $R_1$ and $R_2$.

The recess 74 is formed in the positioning member 30 at the circumferential location corresponding to the location of the abutment portion 72. Thus, the recess 74 can have an axial thickness larger than the axial thickness of the annular support portion 70, if needed. Part of the first retaining mechanism 32 is mounted in the recess 74, as explained below. The recess 74 is arc-shaped, as best seen in FIG. 4.

Referring to FIGS. 2, 4, 5, 6 11, 12, 14 and 15-27, the first retaining mechanism 32 basically includes a pawl element 80 and a ratchet element 82. In this embodiment, the ratchet element 82 is formed by an arc-shaped section of the cover portion 42 having the plurality of circumferentially spaced notches (grooves) or indentations 43 formed therein. Thus, in this embodiment, the ratchet element 82 is integrally formed with the cover portion 42 as a one-piece, unitary member. In any case, the ratchet element 82 is preferably non-movably fixed to the mounting member 24. In this embodiment, the pawl element 80 is mounted on the radially outer portion of the positioning member 30, and the ratchet element 82 is located radially outwardly of the pawl element 80 relative to a rotation axis X.

The pawl element 80 is preferably an arc-shaped member that is constructed of a resilient material such as a resilient plastic material. The pawl element 80 preferably includes an engagement projection 80a extending radially outwardly to selectively engage the grooves 43 and an inwardly extending projection 80b with a curved surface arranged at one end. The pawl element 80 preferably has a curvature corresponding to the curvature of the recess 74, or a slightly smaller curvature. Due to the above configuration, the pawl element 80 preferably elastically deforms in order to move the engagement projection 80a out of engagement with ratchet member 82 (i.e. radially inwardly) when a sufficient rotational force (i.e. a predetermined rotational force) is applied to the positioning member 30. In other words, the engagement projection 80a is selectively received in the notches 43 of the ratchet member 82 to normally prevent rotational movement of the positioning member 30, unless an overriding rotational force is applied thereto (e.g. indirectly from the rider).

Referring to FIGS. 2, 4 and 7-24, the second retaining mechanism 34 basically includes the first retaining pin 64c, the second retaining pin 70c and a friction spring 90 coupled to the retaining pins 64c and 70c. The friction spring 90 includes a first looped end section 90a, a second looped end section 90b and a coiled section 90c. The first looped end section 90a is mounted on the first retaining pin 64c, while the second looped end section 90b is mounted on the second retaining pin 70c. The coiled section 90c is frictionally mounted on the outer surface 46b of the bushing 46 to normally apply a retaining force on the take-up member 28 and the positioning member 30 to normally prevent rotational movement thereof.

However, the second retaining mechanism 34 is arranged and configured to reduce the retaining force applied to the take-up member 28 and the positioning member 30 upon moving the shift operating member 26 in the first rotational direction $R_1$ and the second rotational direction $R_2$, as mentioned above. Specifically, when the shift operating member 26 is rotated in either of the first and second rotational directions $R_1$ or $R_2$, the circumferential spacing between the retaining pins 64c and 70c is reduced. Thus, the retaining force from the coiled section 90c on the bushing 46 is also reduced.

Preferably the pins 64c and 70c are spaced a varying angular amount during operation on the shift operating device 20. Specifically, a minimum angular space $D_1$ is formed between the pins 64c and 70c when the positioning member 30 contacts the take-up member 28, as best seen in FIGS. 16, 18, 22 and 23, while a maximum a minimum angular space $D_2$ is formed between the pins 64c and 70c when the positioning member 30 is spaced from the take-up member 28, as best seen in FIGS. 17, 19-21 and 24.

The assembly and operating of the shift operating device 20 will now be explained in more detail with reference mainly to FIGS. 15-27. When the shift operating device 20 is assembled, the take-up member 28 is first mounted on the shift operating member 26. Then, the friction spring 90 and the positioning member 30 are mounted on the take-up member 26 to form the unit illustrated in FIG. 15. When this unit is assembled, the coil friction spring is slightly preloaded. Specifically, the looped ends 90a and 90b are pulled slightly away from each other (FIG. 16) as compared to their rest positions (FIG. 13). In this state, the internal diameter of the coiled section 90c of the friction spring is the same as the external diameter of the bushing 46 or slightly smaller. Even in the rest position (FIG. 13), the internal diameter of the coiled section 90c of the friction spring is the same as the external diameter of the bushing 46 or slightly smaller. Thus, at least a minimal fiction force is always present between the friction spring 90 and the bushing 46 when the entire shift operating device 20 is assembled.

Figure 17:
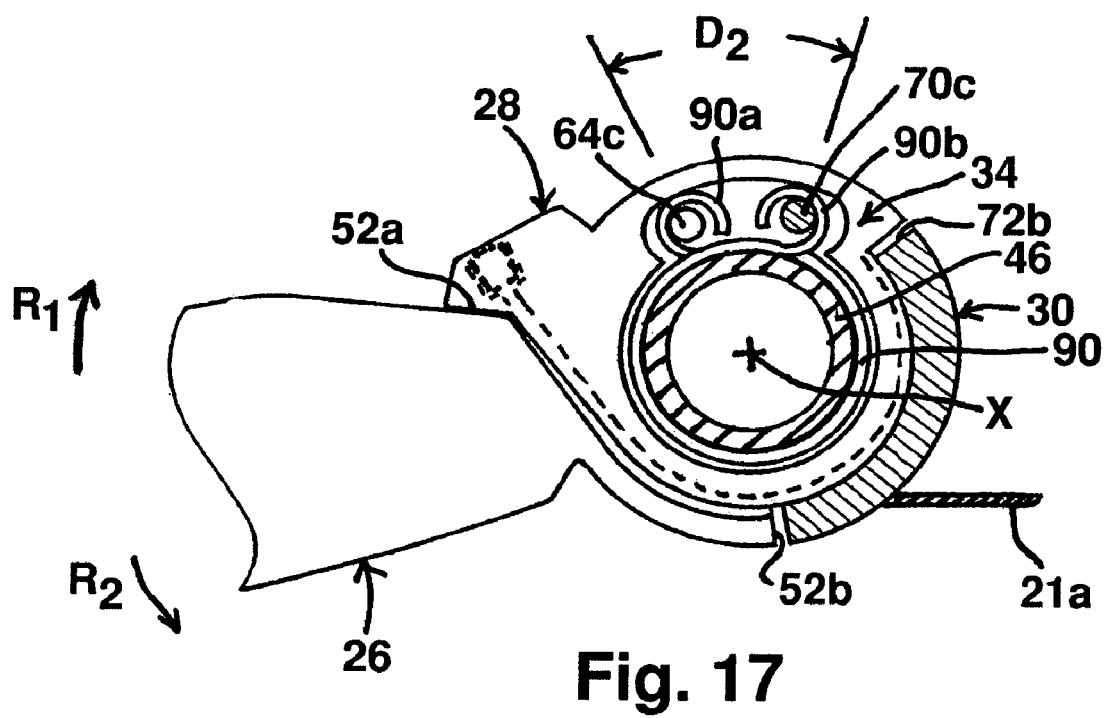
FIG. 17 is a top plan view of the partial device illustrated in FIG. 16, after coupling the shift control cable thereto.

This unit is then slid over the bushing 46, which is mounted on the projecting section 40d of the main mounting portion 40. The pawl element 80 is then inserted in the recess 74 of the positioning member 30, and the cover portion 42 is positioned over the internal unit and fixed to the main mounting portion 40 via the fastener 44. The inner wire 21a of the shift control cable 21 is then threaded through the cable attachment portion 60 of the take-up member 28 and through the barrel adjuster 40f into the outer sheath 21b of the control cable 21. The inner wire 21a is then coupled to the front derailleur 15 in a conventional manner. When the shift control cable 21 is coupled to the front derailleur 15, a counterclockwise force is applied to the take-up member 28 to move it from the position shown in FIG. 16 to the position shown in FIG. 17. In particular, the inner diameter of the friction spring 90 is further tightened around the bushing 46 until the take-up member 28 can no longer rotate (FIG. 17).

Figure 18:
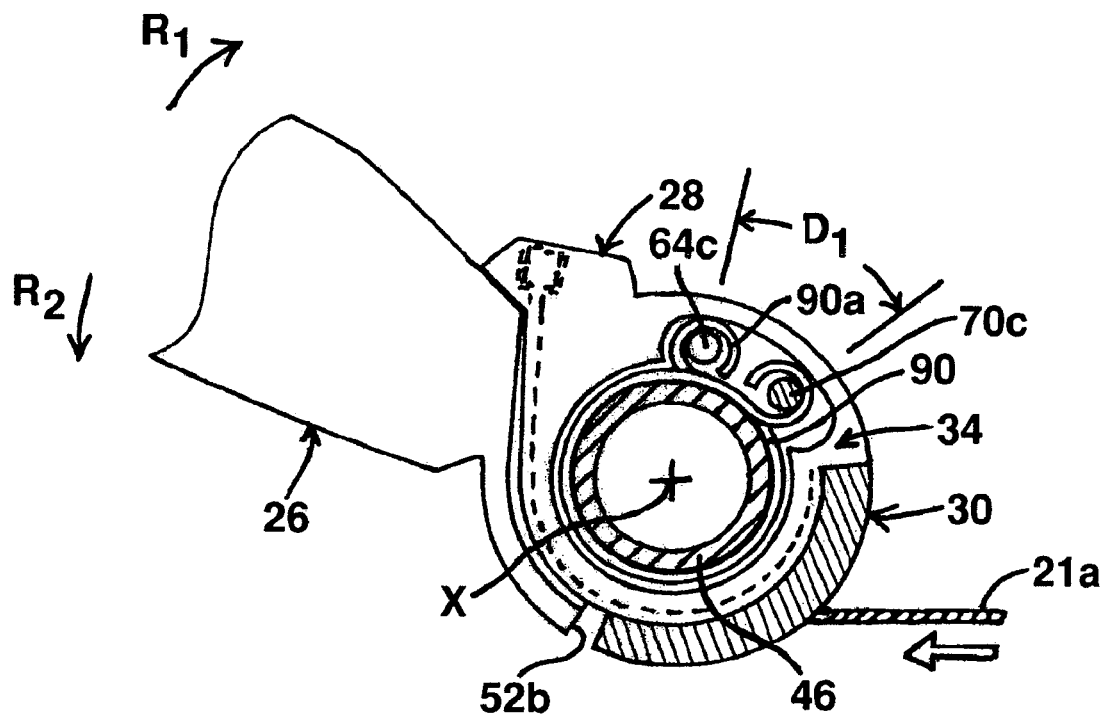
FIG. 18 is a top plan view of the partial device illustrated in FIG. 17, during/after movement of the shift operating member in the first rotational direction.
Figure 19:
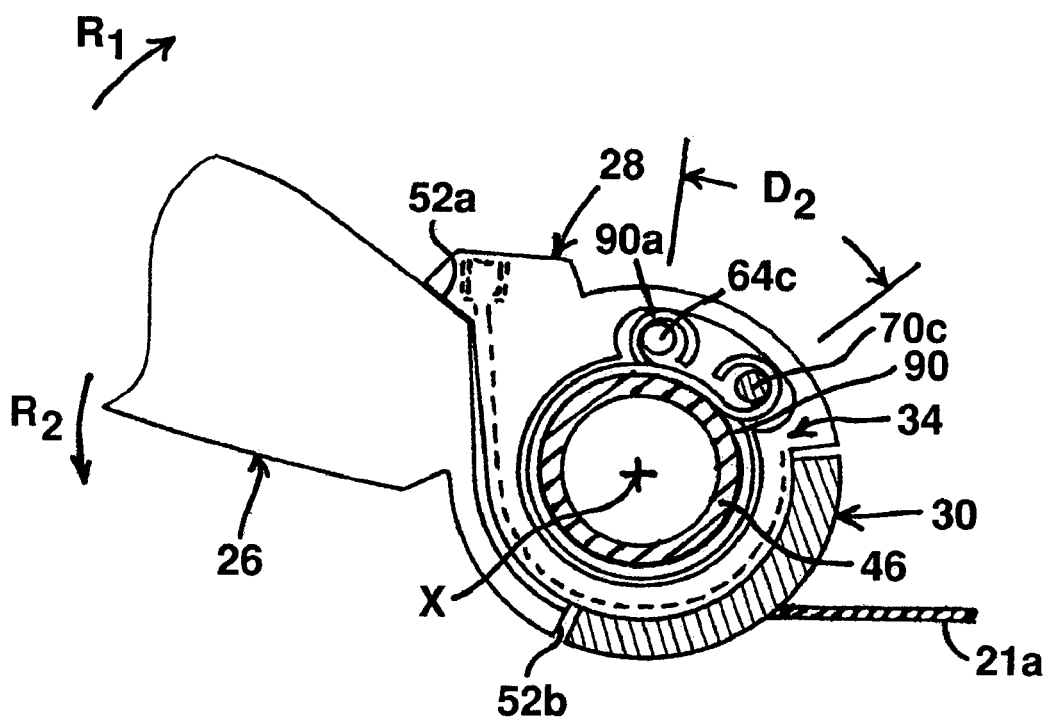
FIG. 19 is a top plan view of the partial device illustrated in FIGS. 17 and 18, after moving the shift operating member in the first rotational direction, and after releasing the shift operating member.

If the rider desires to shift the front derailleur 15 by pulling the shift control cable 21, the rider moves the shift operating member 26 in the first rotational direction $R_1$. This operation is illustrated in FIGS. 17-19. When the rider moves the shift operating member 26 in first rotational direction R₁, the take-up member 28 is also rotated in first rotational direction R₁. However, the positioning member 30 does not initially rotate due to the first retaining mechanism 32. Thus, the retaining pins 64c and 70c move circumferentially toward each other to reduce the retaining (friction) force between the bushing 46 and the friction spring 90.

The take-up member 28 can only move a predetermined amount relative to the positioning member 30 before contacting the positioning member 30. Then, the positioning member 30 rotates with the take-up member 28 in the first rotational direction R₁ against the biasing force of the front derailleur 15, against the retaining force of the first retaining mechanism 32 and against the now reduced retaining force of the second retaining mechanism 34. Of course, the rider is capable of applying such a rotational force to the shift operating member 26 to rotate the shift operating member 26 in the first rotational direction R₁.

Figure 20:
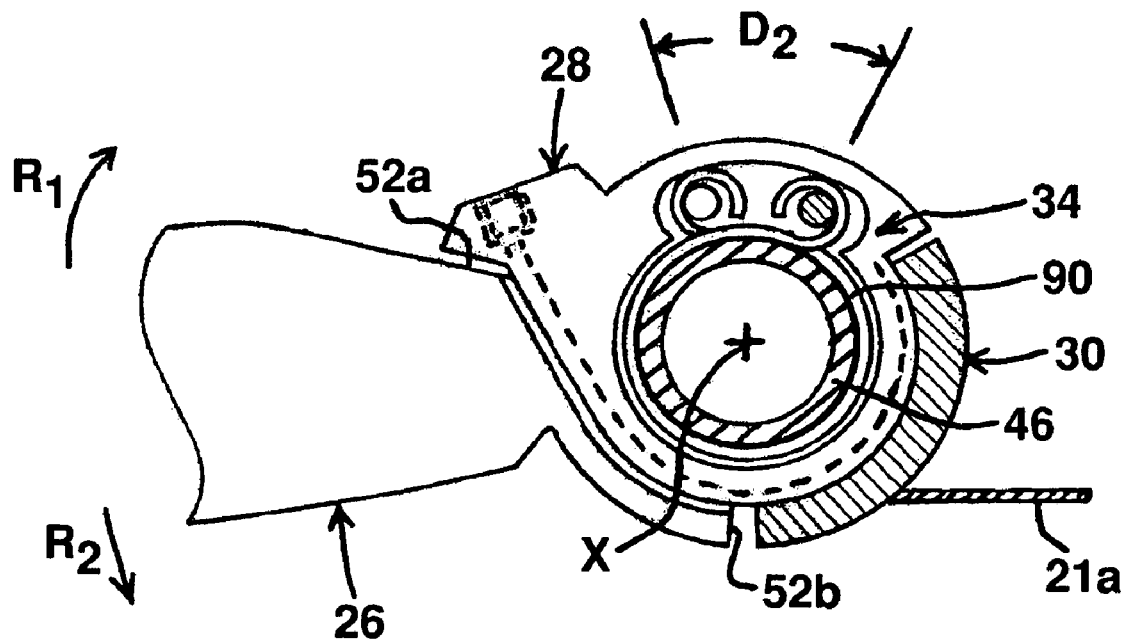
FIG. 20 is a top plan view of the partial device illustrated in FIG. 17, during a first initial stage of movement of the shift operating member in the second rotational direction.
Figure 21:
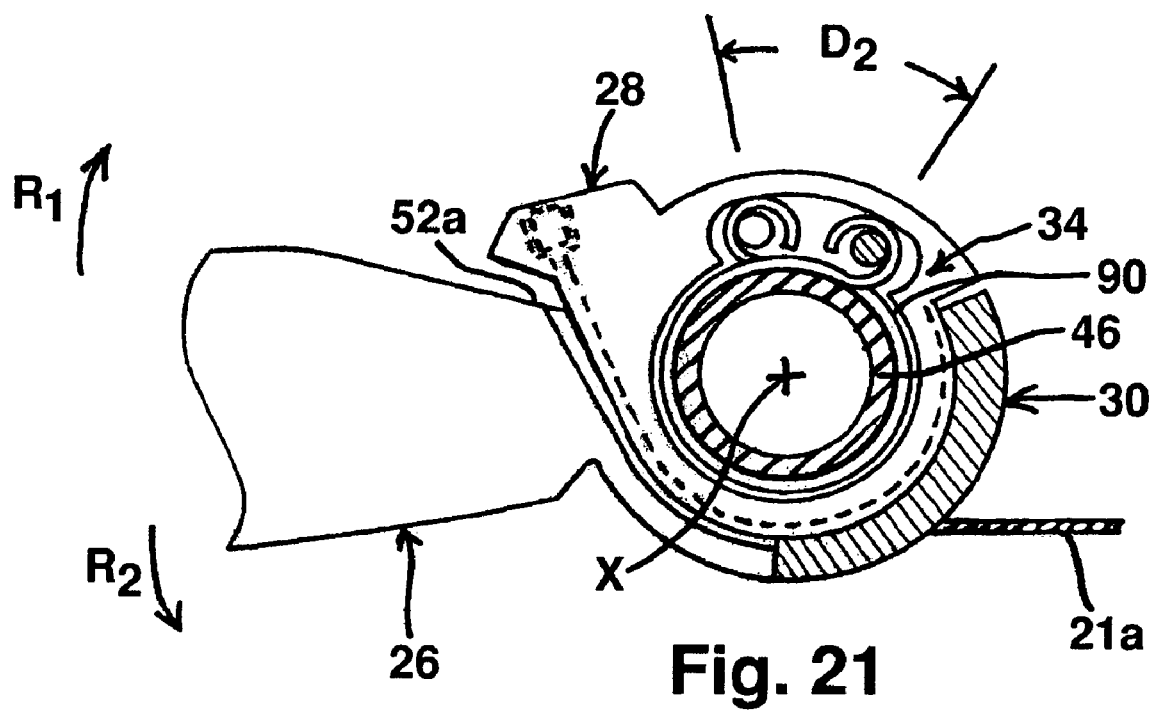
FIG. 21 is a top plan view of the partial device illustrated in FIGS. 17 and 20, during a second initial stage of movement of the shift operating member in the second rotational direction.
Figure 22:
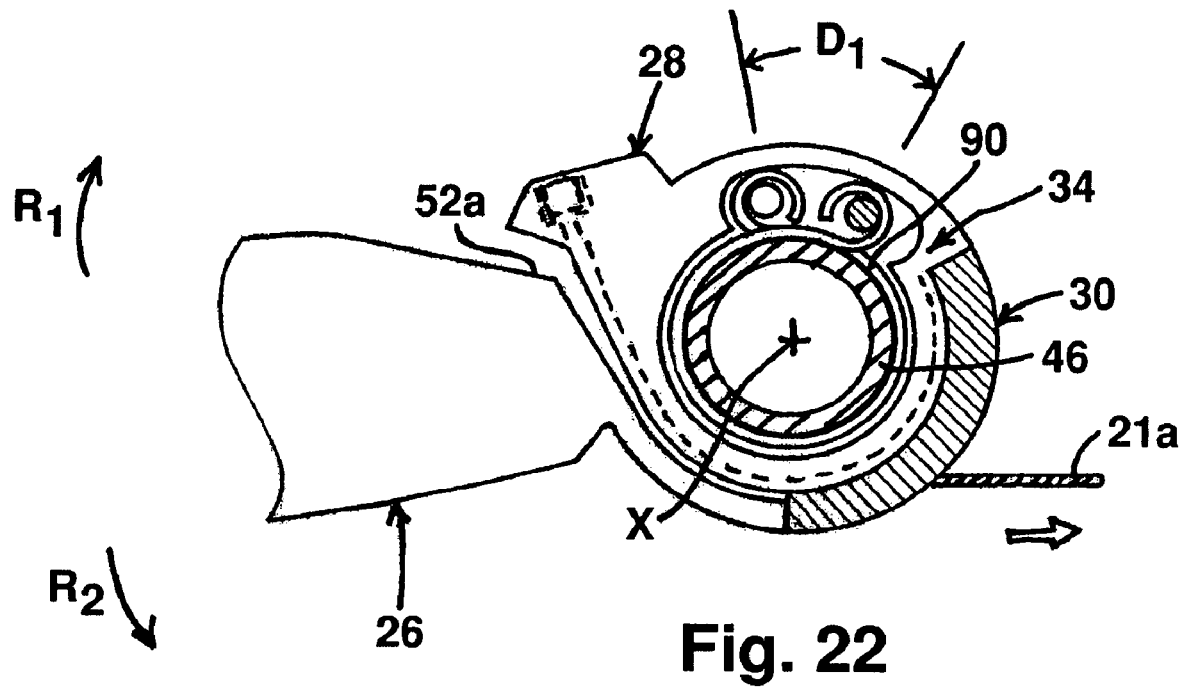
FIG. 22 is a top plan view of the partial device illustrated in FIGS. 17, 20 and 21, during an intermediate stage of movement of the shift operating member in the second rotational direction.
Figure 23:
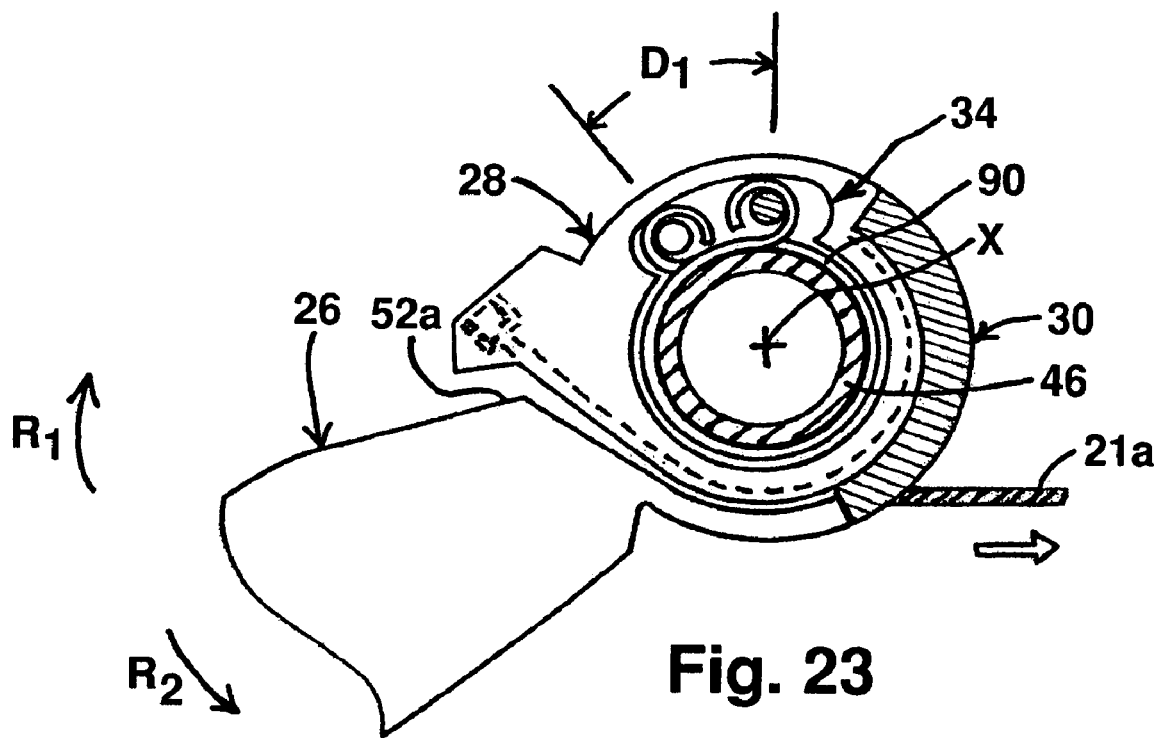
FIG. 23 is a top plan view of the partial device illustrated in FIGS. 17 and 20-22, during/after a final stage of movement of the shift operating member in the second rotational direction.
Figure 24:
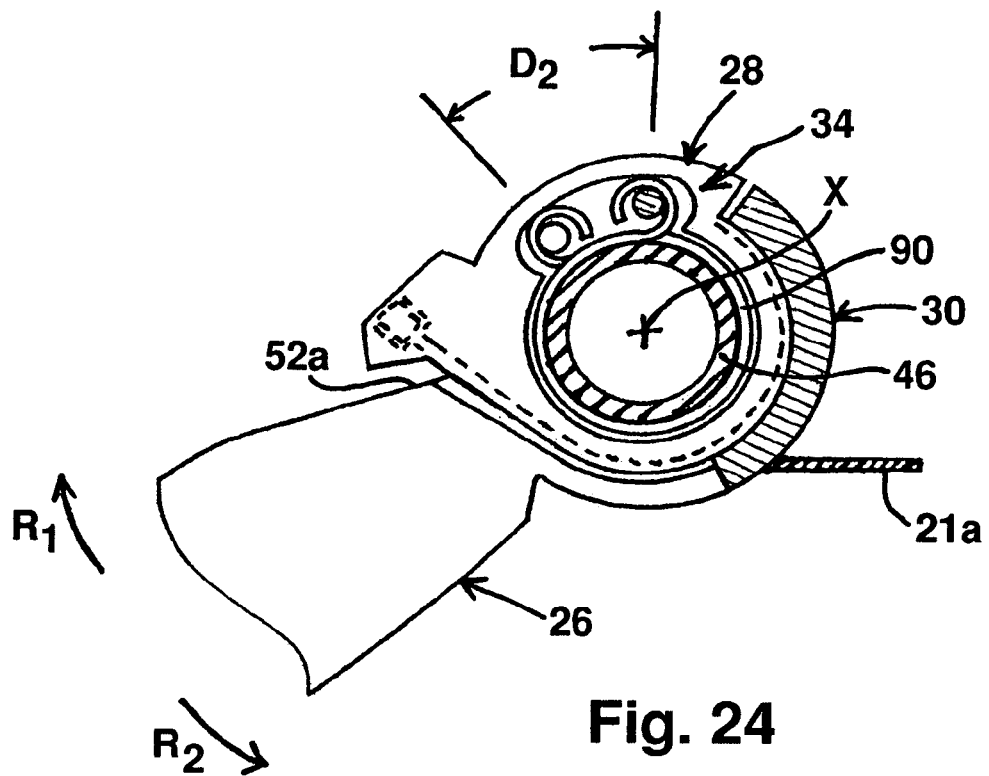
FIG. 24 is a top plan view of the partial device illustrated in FIGS. 17 and 20-22, after the final stage of movement of the shift operating member in the second rotational direction, and after releasing the shift operating member.
Figures 25, 26, 27:
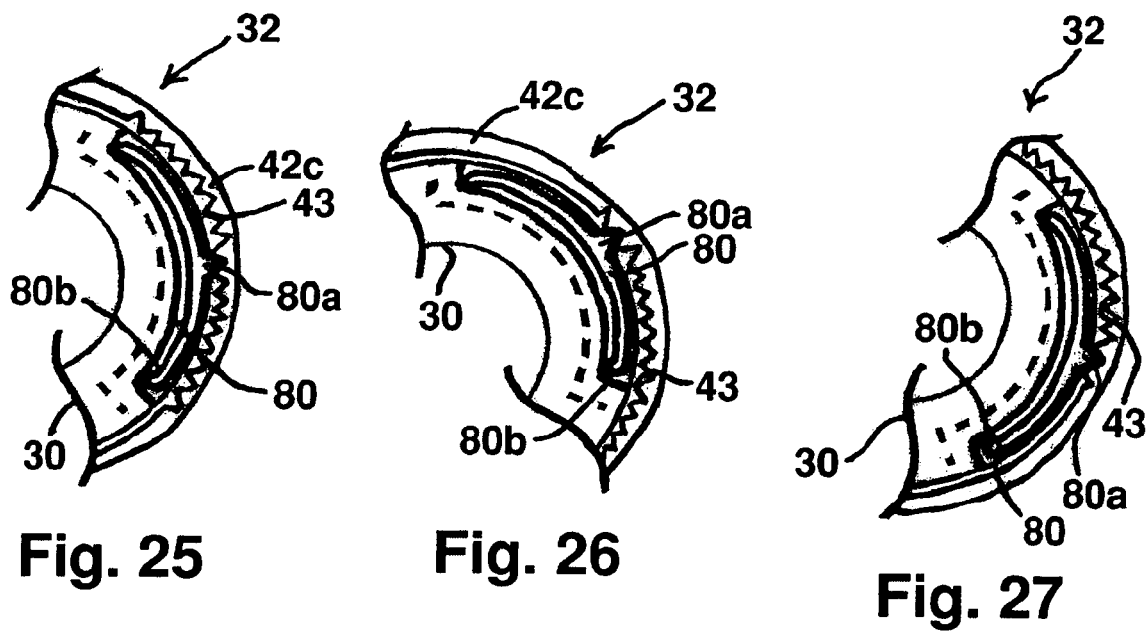
FIG. 25 is a partial top, plan view of the first retaining mechanism of the shift operating device illustrated in FIGS. 2 and 4-24, with the pawl element in a first position and with portions broken away for the purpose of illustration.
FIG. 26 is a top plan view of the partial device illustrated in FIG. 25, after moving the positioning member in the second rotational direction.
FIG. 27 is a top plan view of the partial device illustrated in FIG. 25, after moving the positioning member in the first rotational direction.

If the rider desires to shift the front derailleur 15 by releasing the shift control cable 21, the rider moves the shift operating member 26 in the second rotational direction R₂. This operation is illustrated in FIGS. 17 and 20-24. Initially, when the rider moves the shift operating member 26 in the second rotational direction R₂, the shift operating member 26 moves freely (i.e. until the positioning member is contacted), as seen in FIGS. 17, 20 and 21. Once the shift operating member 26 contacts the positioning member 30, the positioning member 30 will be rotated against the retaining force of the first retaining mechanism 32 (i.e. from the position shown in FIG. 21 to the position shown in FIG. 22). During this stage, the take-up member 28 does not initially rotate in the second rotational direction R₂ due to the second retaining mechanism 34. However, once the positioning member 30 nears the take-up member 28, the retaining force applied by the second retaining mechanism 34 will be reduced. In other words, the retaining pins 64c and 70c move circumferentially toward each other to reduce the retaining (friction) force between the bushing 46 and the friction spring 90.

The retaining force of the second retaining mechanism 34 is lowest when the positioning member 30 contacts the take-up member 28. At this stage (FIG. 22), the take-up member 28 rotates with the positioning member 30. In the second rotational direction R₂, the biasing force of the front derailleur 15 applies a rotational force to rotate the take-up member 26 to assist in rotating the shift operating member 26 to release the cable 21. In other words, the positioning member 30 can only move a predetermined amount relative to the take-up member 28 before contacting the take-up member 30. Then, the take-up member 30 rotates with the take-up member 28 in the second rotational direction R₂ with the biasing force of the front derailleur 15, against the retaining force of the first retaining mechanism 32 and against the now reduced retaining force of the second retaining mechanism 34. Of course, the rider is capable of applying such a rotational force to the shift operating member 26 to rotate the shift operating member 26 in the second rotational direction R₂.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Second Embodiment

Figure 28:
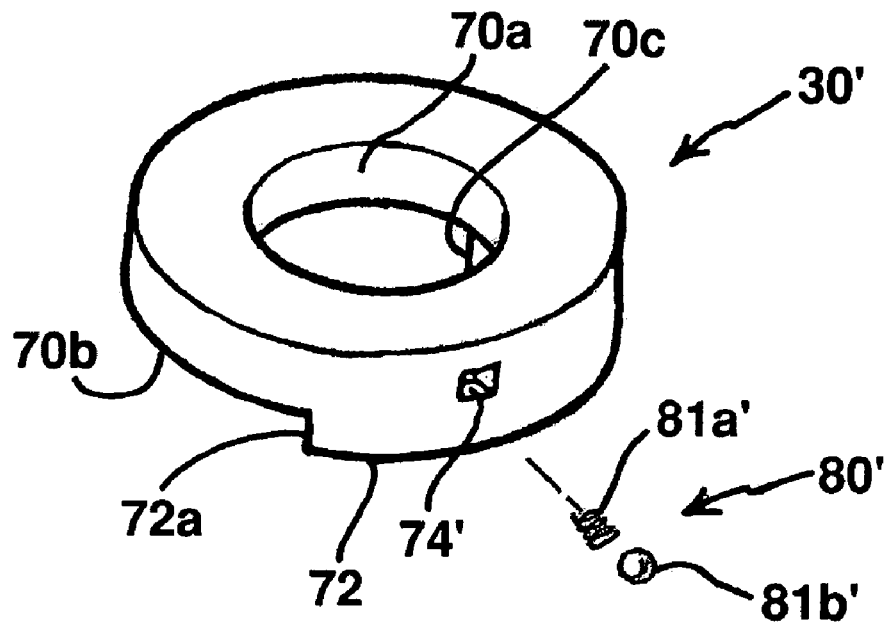
FIG. 28 is an enlarged perspective view of a modified positioning member and pawl element in accordance with a second preferred embodiment of the present invention.

Referring now to FIG. 28, a modified positioning member 30' with a modified pawl element 80' in accordance with a second embodiment will now be explained. The positioning member 30' is identical to the positioning member 30 of the first embodiment, except the modified positioning member 30' has a modified cutout 74' formed therein with the modified pawl element 80' received therein, instead of the recess 74 and the pawl element 80 of the first embodiment. In view of the similarity between the first and second embodiments, the parts of the second embodiment that are identical to the parts of the first embodiment will be given the same reference numerals as the parts of the first embodiment in FIG. 28.

The modified positioning member 30' and the modified pawl element 80' are designed to be mounted in the shift operating device 20 of the first embodiment, in place of the positioning member 30 and the pawl element 80. Accordingly, it will be apparent to those skilled in the art from this disclosure that the descriptions and illustrations of the first embodiment also apply to this second embodiment, except as explained and illustrated herein. In other words, the descriptions of the parts of the second embodiment that are identical to the parts of the first embodiment may be omitted for the sake of brevity.

The modified positioning member 30' is identical to the positioning member 30 of the first embodiment, except the recess 74 of the first embodiment has been eliminated and a blind cutout 74' is formed therein. The modified pawl element 80' basically includes a biasing part (spring) 81a' and an engagement part 81b'. The engagement part 81b' is preferably a spherical ball constructed of a metallic material or a hard plastic material. The biasing part 81a' normally biases the engagement part 81b' into engagement with the notches 43 of the ratchet member 82 to overrideably retain the positioning member 30' in a plurality of rotational positions.

Third Embodiment

Figure 29:
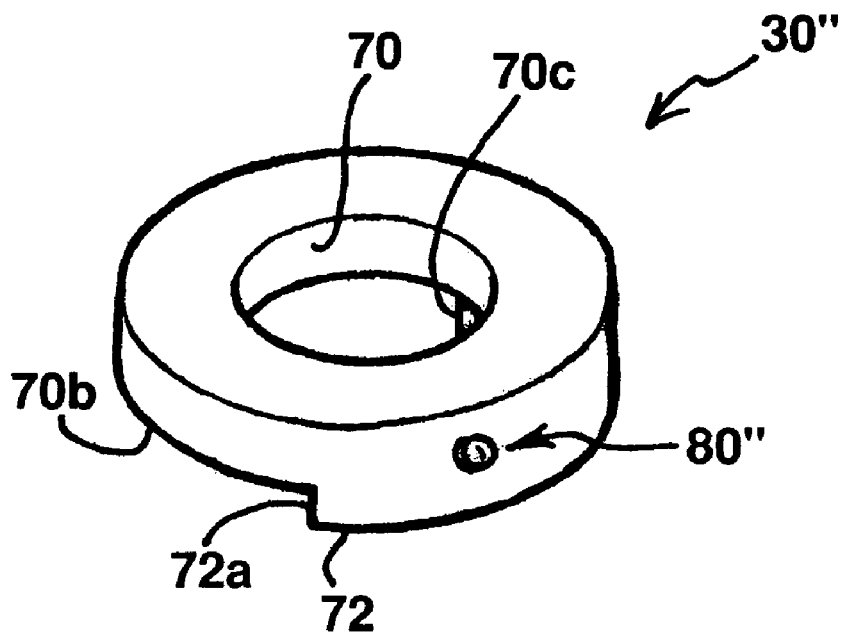
FIG. 29 is an enlarged perspective view of a modified positioning member and pawl element in accordance with a third preferred embodiment of the present invention.

Referring now to FIG. 29, a modified positioning member 30" with a modified pawl element 80" in accordance with a third embodiment will now be explained. The positioning member 30" is identical to the positioning member 30 of the first embodiment, except the modified positioning member 30" has a modified the modified pawl element 80" integrally formed therewith, instead of the recess 74 and the pawl element 80 of the first embodiment. In view of the similarity between the first and third embodiments, the parts of the third embodiment that are identical to the parts of the first embodiment will be given the same reference numerals as the parts of the first embodiment in FIG. 29.

The modified positioning member 30" and the modified pawl element 80" are designed to be mounted in the shift operating device 20 of the first embodiment, in place of the positioning member 30 and the pawl element 80. Accordingly, it will be apparent to those skilled in the art from this disclosure that the descriptions and illustrations of the first embodiment also apply to this third embodiment, except as explained and illustrated herein. In other words, the descriptions of the parts of the third embodiment that are identical to the parts of the first embodiment may be omitted for the sake of brevity.

The modified positioning member 30" is identical to the positioning member 30 of the first embodiment, except the recess 74 of the first embodiment has been eliminated and the modified pawl element 80" is integrally formed therewith. The modified pawl element 80" is basically formed as a protrusion that preferably has a partial spherical shape. The modified pawl element 80" is normally engaged with the notches 43 of the ratchet member 82 of the first embodiment to overrideably retain the positioning member 30" in a plurality of rotational positions. In this embodiment, the positioning member 30" and the cover portion 42 o should be constructed of a materials that are sufficiently rigid, yet flexible such that the pawl element 80" is selectively retained in the notches 43 to apply a retaining force, yet such that the positioning member 30" can be rotated relative to the cover portion 42 upon applying a rotational force greater than the retaining force. Such materials are well known in the bicycle art.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift operating device comprising:
   a mounting member configured to be fixedly coupled to a bicycle;
   a shift operating member rotatably coupled to the mounting member to move in a first rotational direction and a second rotational direction opposite to the first rotational direction;
   a take-up member rotatably coupled to the mounting member, the take-up member being arranged and configured to selectively pull and release a shift control cable;
   a positioning member rotatably coupled to the mounting member;
   a first retaining mechanism arranged and configured to retain the positioning member relative to the mounting member; and
   a second retaining mechanism coupled to the take-up member and the positioning member, the second retaining mechanism being arranged and configured to normally apply a retaining force on the take-up member and the positioning member,
   the second retaining mechanism being further arranged and configured to reduce the retaining force applied to the take-up member and the positioning member upon moving the shift operating member in the first rotational direction and the second rotational direction.

2. The bicycle shift operating device according to claim 1, wherein
   the first retaining mechanism includes a pawl element coupled to the positioning member to rotate therewith and a ratchet element non-movably fixed with the mounting member.

3. The bicycle shift operating device according to claim 2, wherein
   the second retaining mechanism is frictionally engaged with a non-movable portion of the mounting member to apply the retaining force.

4. The bicycle shift operating device according to claim 3, wherein
   the second retaining mechanism includes a coil spring with a first end coupled to the take-up member, a second end coupled to the positioning member and a coiled portion frictionally engaged with the non-movable portion of the mounting member.

5. The bicycle shift operating device according to claim 4, wherein
   the shift operating member is operatively coupled to the positioning member and the take-up member such that rotation of the shift operating member in the first and second rotational directions moves at least one of the first and second ends of the coil spring to change the effective diameter of the coiled portion of the coil spring in order to reduce the frictional retaining force applied to the take-up member and the positioning member.

6. The bicycle shift operating device according to claim 2, wherein
   the pawl element is an arc shaped element constructed of a resilient material that is received in an arc-shaped recess of the positioning member.

7. The bicycle shift operating device according to claim 2, wherein
   the pawl element includes a biasing part and an engagement part at least partially received in a blind cutout of the positioning member.

8. The bicycle shift operating device according to claim 2, wherein
   the pawl element is formed as a protrusion that is integrally formed with the positioning member as a one-piece, unitary member.

9. The bicycle shift operating device according to claim 1, wherein
   the second retaining mechanism is frictionally engaged with a non-movable portion of the mounting member to apply the retaining force.

10. The bicycle shift operating device according to claim 9, wherein
    the second retaining mechanism includes a coil spring with a first end coupled to the take-up member, a second end coupled to the positioning member and a coiled portion frictionally engaged with the non-movable portion of the mounting member.

11. The bicycle shift operating device according to claim 10, wherein
    the first and second ends of the coil spring include first and second looped sections, and the take-up member and the positioning member include first and second retaining elements with the first and second looped sections mounted thereto, respectively.

12. The bicycle shift operating device according to claim 10, wherein
the shift operating member is operatively coupled to the positioning member and the take-up member such that rotation of the shift operating member in the first and second rotational directions moves at least one of the first and second ends of the coil spring to change the effective diameter of the coiled portion of the coil spring in order to reduce the frictional retaining force applied to the take-up member and the positioning member.

13. The bicycle shift operating device according to claim 12, wherein
the shift operating member directly contacts the positioning member to rotate the positioning member in at least one of the first and second rotational directions and the positioning member directly contacts the take-up member to rotate the take-up member in the at least one of the first and second rotational directions when the positioning member is rotated in the at least one of the first and second rotational directions.

14. The bicycle shift operating device according to claim 10, wherein
the non-movable portion of the mounting member is a mounting projection with the coiled portion of the coil spring frictionally engaged with an external surface of the mounting projection.

15. The bicycle shift operating device according to claim 14, wherein
the shift operating member directly contacts the take-up member to rotate the take-up member in the first rotational direction when the shift operating member is rotated in the first rotational direction.

16. The bicycle shift operating device according to claim 15, wherein
the shift operating member directly contacts the positioning member to rotate the positioning member in the second rotational direction and the positioning member directly contacts the take-up member to rotate the take-up member in the second rotational direction when the positioning member is rotated in the second rotational direction.

17. The bicycle shift operating device according to claim 1, wherein
the shift operating member, the take-up member and the positioning member are rotatable about a common pivot axis.

18. The bicycle shift operating device according to claim 1, wherein
the shift operating member directly contacts the take-up member to rotate the take-up member in the first rotational direction when the shift operating member is rotated in the first rotational direction.

19. The bicycle shift operating device according to claim 18, wherein
the shift operating member directly contacts the positioning member to rotate the positioning member in the second rotational direction, and the positioning member directly contacts the take-up member to rotate the take-up member in the second rotational direction when the positioning member is rotated in the second rotational direction.

* * * * *